H. I. DRAKE.
ENGINE GEAR.
APPLICATION FILED APR. 13, 1907.

899,247.

Patented Sept. 22, 1908.
2 SHEETS—SHEET 2.

Witnesses
G. R. Thomas

Inventor
H. I. Drake
By Chandler & Chandler
Attorneys

UNITED STATES PATENT OFFICE.

HARDY I. DRAKE, OF NESS CITY, KANSAS.

ENGINE-GEAR.

No. 899,247.　　　　Specification of Letters Patent.　　　Patented Sept. 22, 1908.

Application filed April 13, 1907. Serial No. 368,012.

*To all whom it may concern:*

Be it known that I, HARDY I. DRAKE, a citizen of the United States, residing at Ness City, in the county of Ness, State of Kansas, have invented certain new and useful Improvements in Engine-Gears; and I do hereby declare the following to be a full, clear, and exact description of the invention, such as will enable others skilled in the art to which it appertains to make and use the same.

This invention relates to new and useful improvements in transmission gears, and it has particular reference to the transmission gears of traction engines, the object being to provide a system of gearing which will permit of a maximum transmission of power, and which will eliminate the objectionable side draft when pulling as when cultivating.

Figure 1:
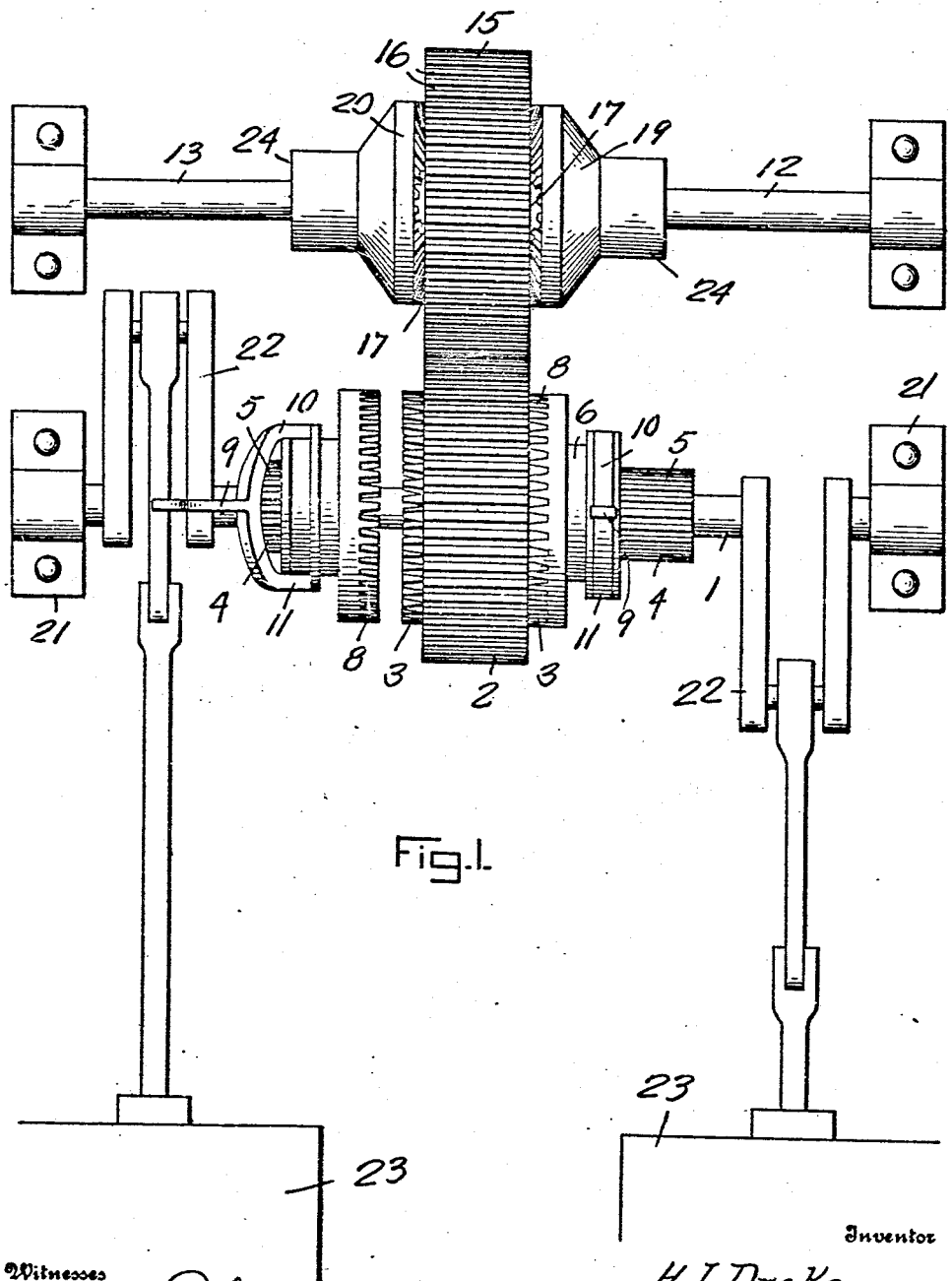
Figure 2:
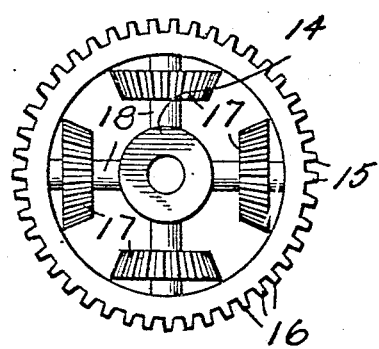
Figure 3:
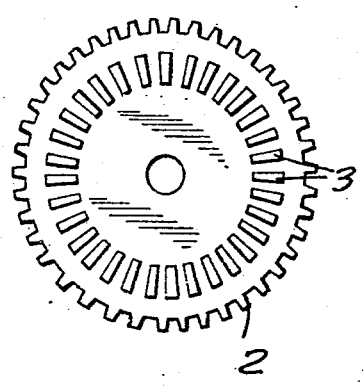
Figure 4:
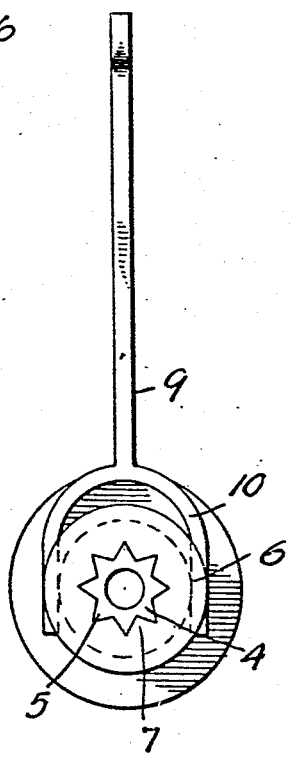

The invention resides in the novel construction, combination and arrangement of parts, the details of which will appear in the course of the following description, in which reference is had to the accompanying drawings forming a part of this specification, like characters of reference designating similar parts throughout the several views, wherein:

Figure 1 is plan view of a transmission gearing constructed in accordance with the present invention. Fig. 2 is a side elevation of a compensating gear embodied in the invention. Fig. 3 is a side elevation of a main transmission gear, the other side being of the same construction. Fig. 4 is an elevation looking at one side of either of the clutch members which are disposed on each side of the main gear.

Referring specifically to the accompanying drawings, the numeral 1 designates a power shaft driven from the engine and upon which is loosely mounted the main gear 2, the latter being constituted of a spur wheel, and formed on its sides with deep crown teeth 3. Hubs 4 formed with radially extending teeth 5 are fixed upon the shaft 1 on each side of the wheel 2 and slidable upon said hubs are clutch members 6 having inwardly extending teeth 7, interfitting between the teeth 5, and thus positively locking the members 6 against rotation with relation to the hubs 4. The members 6 are slidable upon said hubs and on their faces are formed with crown teeth 8 which are designed to mesh with the teeth 3 upon the inward movement of the members 6, and thus lock the gear 2 to said members. The sliding movement of the members 6 is effected by means of pivoted levers 9 terminating at their lower ends in yokes 10 engaged in peripheral annular grooves 11 in the members 6.

The numerals 12 and 13 denote the transmission shafts, the inner ends of which meet in the hub 14 of a compensating gear 15, the latter having spur teeth 16 meshing with the gear 2, and having bevel cog wheels 17 rotatably mounted on its spokes 18. The gear 15 runs loosely upon the shafts 12 and 13, and drives the same by means of the engagement of its cog wheels 17 with bevel pinions 19 and 20 fast on said respective shafts.

The shaft 1 is supported in bearings 21 and is constructed with cranks 22 driven from the engines 23. It is preferred to employ suitable collars 24 to hold the pinions 19 and 20 against axial movement.

The invention is designed for use on heavy agricultural machinery and more particularly, traction engines, in which use gear wheels will be provided on the end of the shaft 12 to drive the main bull gear wheel of the engine and the usual belt wheel will be placed on the end of the shaft 13. The applications of the invention as a power saving device are manifold.

From the foregoing description it will be seen that simple and efficient means are provided for accomplishing the objects of the invention, but, while the elements herein shown and described are well adapted to serve the functions set forth, it is obvious that various minor changes may be made in the proportions, shape and arrangement of the several parts, without departing from the spirit and scope of the invention as defined in the appended claims.

What is claimed, is:

In a gearing of the class described, the combination with a main driving shaft, of a gear wheel loosely mounted thereon, and having crown teeth at opposite sides thereof, radially toothed pinions fixed to the shaft at opposite sides and adjacent the loose gear wheel, hubs having internal teeth engaging the teeth of the pinions and slidable upon the latter, crown teeth projecting from one side of each hub, and adapted to interfit the crown teeth of the loose gear wheel, and throw levers operating the hubs to move the same on said pinions to bring the crown teeth of the hubs into engagement with the crown teeth of the gear wheel whereby the latter will be locked to the main driving shaft.

In testimony whereof, I affix my signature, in presence of two witnesses.

HARDY I. DRAKE.

Witnesses:
W. J. DRAKE,
JOSEPH F. HEATWOLE.